US012706236B2

(12) United States Patent
Trevors et al.

(10) Patent No.: US 12,706,236 B2
(45) Date of Patent: Aug. 11, 2026

(54) SWITCHABLE MAGNETIC APPARATUS WITH REDUCED SWITCHING FORCE AND METHODS THEREOF

(71) Applicant: LANTHA TECH LTD., Calgary (CA)

(72) Inventors: Evan Trevors, Austin, TX (US); Nicholas Simin, Calgary (CA)

(73) Assignee: LANTHA TECH LTD., Calgary (CA)

( * ) Notice: Subject to any disclaimer, the term of this patent is extended or adjusted under 35 U.S.C. 154(b) by 123 days.

(21) Appl. No.: 18/293,279

(22) PCT Filed: Jul. 29, 2022

(86) PCT No.: PCT/CA2022/051168
§ 371 (c)(1),
(2) Date: Jan. 29, 2024

(87) PCT Pub. No.: WO2023/004514
PCT Pub. Date: Feb. 2, 2023

(65) Prior Publication Data
US 2024/0355519 A1 Oct. 24, 2024

Related U.S. Application Data

(60) Provisional application No. 63/227,121, filed on Jul. 29, 2021.

(51) Int. Cl.
*H01F 7/04* (2006.01)

(52) U.S. Cl.
CPC .................................... *H01F 7/04* (2013.01)

(58) Field of Classification Search
CPC ........................................................ H01F 7/04
(Continued)

(56) References Cited

U.S. PATENT DOCUMENTS 2,287,286 A 6/1942 Bing et al.
3,079,191 A 2/1963 Engelsted et al.
(Continued)

FOREIGN PATENT DOCUMENTS

CA 2856138 A1 6/2013
EP 3067258 B1 1/2019
(Continued)

OTHER PUBLICATIONS

International Search Report of PCT/CA2022/051168.
(Continued)

*Primary Examiner* — Alexander Talpalatski

(57) ABSTRACT

A switchable magnetic apparatus has a first layer having one or more first-layer magnets, a second layer on a rear side of the first layer and having one or more second-layer magnets, and a third layer on a rear side of the second layer. The first and second layers are movable relative to each other between an ON position and an OFF position for switching the apparatus between an ON state and an OFF state. The third layer has one or more third-layer magnets for applying a first force to the one or more second-layer magnets when the second layer is at a position intermediate the ON and OFF positions, and the first force is at a direction opposite to a second force applied to the one or more second-layer magnets by the first-layer magnets when the second layer is at the position intermediate the ON and OFF positions.

20 Claims, 9 Drawing Sheets

(58) Field of Classification Search
USPC .......................................................... 335/285
See application file for complete search history.

(56) References Cited

U.S. PATENT DOCUMENTS

| | | | | |
|---|---|---|---|---|
| 3,121,193 | A * | 2/1964 | Engelsted | B23Q 3/1546 335/295 |
| 3,336,551 | A * | 8/1967 | Stead | B23Q 3/1546 335/295 |
| 3,599,305 | A | 8/1971 | Aurich | |
| 3,775,717 | A | 11/1973 | Braillon | |
| 4,055,824 | A | 10/1977 | Baermann | |
| 4,251,791 | A | 2/1981 | Yanagisawa et al. | |
| 4,329,673 | A | 5/1982 | Uchikune et al. | |
| 4,419,644 | A | 12/1983 | Baermann | |
| 4,468,649 | A * | 8/1984 | Matsuhashi | B23Q 3/1546 335/295 |
| 4,575,702 | A * | 3/1986 | Nitta | B23Q 3/1546 335/286 |
| 4,663,602 | A * | 5/1987 | Pignataro | B23Q 3/1546 335/286 |
| 4,679,021 | A * | 7/1987 | Braillon | B23Q 3/1546 335/295 |
| 5,448,803 | A | 9/1995 | Morell | |
| 5,641,105 | A | 6/1997 | Goto | |
| 5,800,106 | A | 9/1998 | Miller | |
| 5,832,831 | A | 11/1998 | Boyle et al. | |
| 6,344,344 | B1 | 2/2002 | Kazarinova et al. | |
| 6,707,360 | B2 | 3/2004 | Underwood et al. | |
| 6,758,146 | B2 | 7/2004 | Post | |
| 6,846,168 | B2 | 1/2005 | Davis et al. | |
| 7,012,495 | B2 * | 3/2006 | Underwood | B23Q 3/1546 269/8 |
| 7,161,451 | B2 | 1/2007 | Shen | |
| 7,468,646 | B2 | 12/2008 | Osterberg | |
| 7,942,458 | B2 | 5/2011 | Patterson | |
| 8,009,001 | B1 | 8/2011 | Cleveland | |
| 8,167,263 | B1 | 5/2012 | Zampelli | |
| 8,256,098 | B2 | 9/2012 | Michael | |
| 8,350,663 | B1 | 1/2013 | Michael | |
| 8,917,154 | B2 | 12/2014 | Fullerton et al. | |
| 8,937,521 | B2 | 1/2015 | Fullerton et al. | |
| 9,093,207 | B2 | 7/2015 | Fullerton et al. | |
| 9,111,672 | B2 | 8/2015 | Fullerton et al. | |
| 9,245,677 | B2 | 1/2016 | Fullerton et al. | |
| 9,502,166 | B2 | 11/2016 | Jeong et al. | |
| 9,818,522 | B2 | 11/2017 | Kocijan | |
| 10,031,559 | B1 | 7/2018 | Hamel et al. | |
| 12,100,545 | B2 * | 9/2024 | Morton | H01F 7/0257 |
| 2004/0239460 | A1 | 12/2004 | Kocijan | |
| 2007/0029889 | A1 | 2/2007 | Dunn et al. | |
| 2010/0281933 | A1 | 11/2010 | Barrieau | |
| 2011/0248806 | A1 | 10/2011 | Michael | |
| 2016/0289046 | A1 | 10/2016 | Norton et al. | |
| 2018/0233856 | A1 | 8/2018 | Brandwijk | |
| 2019/0152544 | A1 | 5/2019 | Outa | |
| 2019/0293232 | A1 | 9/2019 | Franklin | |
| 2020/0036238 | A1 | 1/2020 | Copelamd, Jr. et al. | |
| 2020/0306969 | A1 | 10/2020 | Bryner et al. | |
| 2020/0321393 | A1 | 10/2020 | Manipatruni et al. | |
| 2021/0023681 | A1 | 1/2021 | Robinson, Jr. et al. | |
| 2021/0031335 | A1 | 2/2021 | Morton et al. | |

FOREIGN PATENT DOCUMENTS

| | | | |
|---|---|---|---|
| GB | 1274533 | A | 5/1972 |
| GB | 2130797 | A | 6/1984 |
| WO | 1999038726 | A1 | 8/1999 |
| WO | 2002058092 | A1 | 7/2002 |
| WO | 2019005034 | A1 | 1/2019 |
| WO | 2019148159 | A1 | 8/2019 |
| WO | 2019165228 | A1 | 8/2019 |
| WO | 2020086791 | A1 | 4/2020 |
| WO | 2020150719 | A1 | 7/2020 |
| WO | 2021239235 | A1 | 12/2021 |

OTHER PUBLICATIONS

Written Opinion of PCT/CA2022/051168.
"One-Sided Fluxes—A Magnetic Curiosity" by J. C. Mallinson, published in IEEE Transactions on Magnetics, vol. Mag-9, No. 4, Dec. 1973.
"Design of Permanent Multipole Magnets with Oriented Rare Earth Cobalt Material" by K. Halbach, published in Nuclear Instruments and Methods, vol. 169.1, p. 1-10, Feb. 1980.
J. Javor, S. Sundaram, C. S. Chen and D. J. Bishop, "A Microtissue Platform to Simultaneously Actuate and Detect Mechanical Forces via Non-Contact Magnetic Approach," in Journal of Microelectromechanical Systems, vol. 30, No. 1, pp. 96-104, Feb. 2021.

* cited by examiner

SWITCHABLE MAGNETIC APPARATUS WITH REDUCED SWITCHING FORCE AND METHODS THEREOF

CROSS-REFERENCE TO RELATED APPLICATIONS

This Application is a national stage application of PCT/CA2022/051168. This application claims priorities from PCT Application No. PCT/CA2022/051168, filed Jul. 29, 2022, and from U.S. Provisional Patent Application Ser. No. 63/227,121, filed Jul. 29, 2021, the content of which is incorporated herein by reference in its entirety.

TECHNICAL FIELD

The present disclosure relates generally to switchable magnetic apparatuses and in particular to switchable magnetic apparatuses with reduced switching force.

BACKGROUND

Switchable magnetic devices using permanent magnets are known. In such devices, a magnetic field towards a predefined direction may be enabled and disabled by switching the relative positions of a plurality of permanent magnets between an ON position and an OFF position.

For example, U.S. Pat. No. 8,256,098 B2 to Michael teaches a method for producing a switchable core element-based permanent magnet apparatus used for holding and lifting a target. The apparatus comprises two or more carrier platters containing core elements. The core elements are magnetically matched soft steel pole conduits attached to the north and south magnetic poles of one or more permanent magnets, inset into carrier platters. The pole conduits contain and redirect the permanent magnets' magnetic field to the upper and lower faces of the carrier platters. By containing and redirecting the magnetic field within the pole conduits, like poles have a simultaneous level of attraction and repulsion. Aligning upper core elements "in-phase," with the lower core elements, activates the apparatus by redirecting the magnetic fields of both pole conduits into the target. Anti-aligning upper core elements "out-of-phase," with the lower core elements, deactivates the apparatus resulting in pole conduits containing opposing fields.

U.S. Pat. No. 8,350,663 to Michael teaches a method for creating a device for a rotary switchable multi-core element, permanent magnet-based apparatus for holding or lifting a target. The apparatus comprises of two or more carrier platters, each containing a plurality of complementary first and second core elements. Each core element comprises permanent magnet(s) with magnetically matched soft steel pole conduits attached to the north and south poles of the magnet(s). Core elements are oriented within adjacent carrier platters such that relative rotation allows for alignment in-phase or out-of-phase of the magnetic north and south fields within the pole conduits. Aligning a first core element "in-phase" with a second core element, that is, north-north/south-south, activates that core element pair, allowing the combined magnetic fields of the pole conduits to be directed into a target. Aligning the core element pair "out-of-phase," that is, north-south/south-north, deactivates that core element pair by containing opposing fields within the pole conduits.

U.S. Pat. No. 9,818,522 B2 to Kocijan teaches a method and device for self-regulated flux transfer from a source of magnetic energy into one or more ferromagnetic work-pieces, wherein a plurality of magnets, each having at least one N-S pole pair defining a magnetization axis, are disposed in a medium having a first relative permeability, the magnets being arranged in an array in which gaps of predetermined distance are maintained between neighboring magnets in the array and in which the magnetization axes of the magnets are oriented such that immediately neighboring magnets face one another with opposite polarities, such arrangement representing a magnetic tank circuit in which internal flux paths through the medium exist between neighboring magnets and magnetic flux access portals are defined between oppositely polarized pole pieces of such neighboring magnets, and wherein at least one working circuit is created which has a reluctance that is lower than that of the magnetic tank circuit bringing one or more of the magnetic flux access portals into close vicinity to or contact with a surface of a ferromagnetic body having a second relative permeability that is higher than the first relative permeability, whereby a limit of effective flux transfer from the magnetic tank circuit into the working circuit will be reached when the workpiece approaches magnetic saturation and the reluctance of the work circuit substantially equals the reluctance of the tank circuit.

An issue in permanent-magnet-based switchable magnetic devices is that such devices usually require a significant force to overcome the magnetic resistance for switching the magnets thereof between the ON and OFF positions.

Therefore, there is a desire for a novel switchable magnetic apparatuses with reduced switching force.

SUMMARY

According to one aspect of this disclosure, there is provided a switchable magnetic apparatus comprising: a first layer comprising a set of one or more first-layer magnets; a second layer on a rear side of the first layer, the second layer comprising a set of one or more second-layer magnets; and a third layer on a rear side of the second layer, the third layer comprising a set of one or more third-layer magnets; the first and second layers being movable relative to each other for switching the switchable magnetic apparatus between an ON state and an OFF state; the one or more second-layer magnets form a plurality of alternating second-layer poles adjacent the third layer; the one or more third-layer magnets form one or more third-layer poles adjacent the second layer for reducing a force to switch the switchable magnetic apparatus between the ON state and the OFF state; when in the ON state, at least a majority of each third-layer pole is aligned with a first one of the second-layer poles, and each third-layer pole and the corresponding second-layer pole aligned therewith are opposite poles; and when in the OFF state, at least a majority of each third-layer pole is aligned with a second one of the second-layer poles, and each third-layer pole and the corresponding second-layer pole aligned therewith are same poles.

In some embodiments, one of the one or more third-layer magnets is a single-piece magnet.

In some embodiments, one of the one or more third-layer magnets comprises a plurality of magnet pieces.

In some embodiments, each set of the one or more first-layer magnets, the one or more second-layer magnets, and the one or more third-layer magnets are linearly positioned.

In some embodiments, each set of the one or more first-layer magnets, the one or more second-layer magnets, and the one or more third-layer magnets are circularly positioned.

In some embodiments, the first and second layers are linearly movable relative to each other or rotatably movable relative to each other.

In some embodiments, a polarity of each of the one or more first-layer magnets is parallel to the first layer.

In some embodiments, the first layer comprises a plurality of first-layer magnets, and adjacent pairs of the plurality of first-layer magnets have opposite polarities.

In some embodiments, the plurality of first-layer magnets are interleaved with a plurality of ferromagnetic blocks.

In some embodiments, a polarity of each of the one or more second-layer magnets is perpendicular to the polarities of the plurality of first-layer magnets, and adjacent second-layer magnets have opposite polarities.

In some embodiments, the plurality of second-layer magnets are interleaved with a plurality of non-ferromagnetic spacers.

In some embodiments, a polarity of each of the one or more second-layer magnets is parallel to the second layer.

In some embodiments, a polarity of each of the one or more third-layer magnets is perpendicular to the third layer.

In some embodiments, a polarity of each of the one or more third-layer magnets is parallel to the third layer.

In some embodiments, the third layer comprising one or more additional magnets each positioned between two adjacent poles of the second layer.

In some embodiments, the one or more first-layer magnets, the one or more second-layer magnets, the one or more third-layer magnets, and the one or more additional magnets comprise one or more permanent magnets.

According to one aspect of this disclosure, there is provided a switchable magnetic apparatus comprising: a first layer comprising one or more first-layer magnets; a second layer on a rear side of the first layer, the second layer comprising one or more second-layer magnets, the first and second layers being movable relative to each other between an ON position and an OFF position for switching the switchable magnetic apparatus between an ON state and an OFF state; and a third layer on a rear side of the second layer; the third layer comprises one or more third-layer magnets for applying a first force to the one or more second-layer magnets when the second layer is at a position intermediate the ON and OFF positions; and the first force is at a direction opposite to a second force applied to the one or more second-layer magnets by the first-layer magnets when the second layer is at the position intermediate the ON and OFF positions.

According to one aspect of this disclosure, there is provided a switchable magnetic apparatus comprising: a front layer comprising one or more front-layer magnets interleaved with a plurality of ferromagnetic blocks, the polarities of the one or more front-layer magnets being in a same plane and adjacent pairs of the one or more front-layer magnets having opposite polarities; a rear layer on a rear side of the front layer, the rear layer comprising a plurality of rear-layer magnets interleaved with a plurality of spacers, the polarities of the rear-layer magnets being perpendicular to the polarities of the one or more front-layer magnets, and adjacent rear-layer magnets having opposite polarities, the front and rear layers being movable relative to each other for switching the switchable magnetic apparatus between an ON state and an OFF state; and a switching-force-reduction layer on a rear side of the rear layer, the switching-force-reduction layer comprising one or more force-reduction magnets, each force-reduction magnet comprising or causing a first pole adjacent the rear layer for reducing a force to switch the switchable magnetic apparatus between the ON state and the OFF state; each rear-layer magnet overlaps one of the ferromagnetic blocks along a forward-rearward direction, and each of the plurality of spacers overlaps one of the one or more front-layer magnets along the forward-rearward direction; when in the ON state, each ferromagnetic block is adjacent same magnetic poles of the front-layer and rear-layer magnets, and the first pole of each force-reduction magnet is adjacent an end with an opposite pole of a first one of the rear-layer magnets; and when in the OFF state, each ferromagnetic block is adjacent different magnetic poles of the front-layer and rear-layer magnets, and the first pole of each force-reduction magnet is adjacent an end with a same pole of a second one of the rear-layer magnets.

Other aspects and embodiments of the disclosure are evident in view of the detailed description provided herein.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Embodiments of the present disclosure will now be described with reference to FIG. 1 through FIG. 12B, which show non-limiting embodiments of a switchable magnetic apparatus of the present disclosure.

Figure 1A:
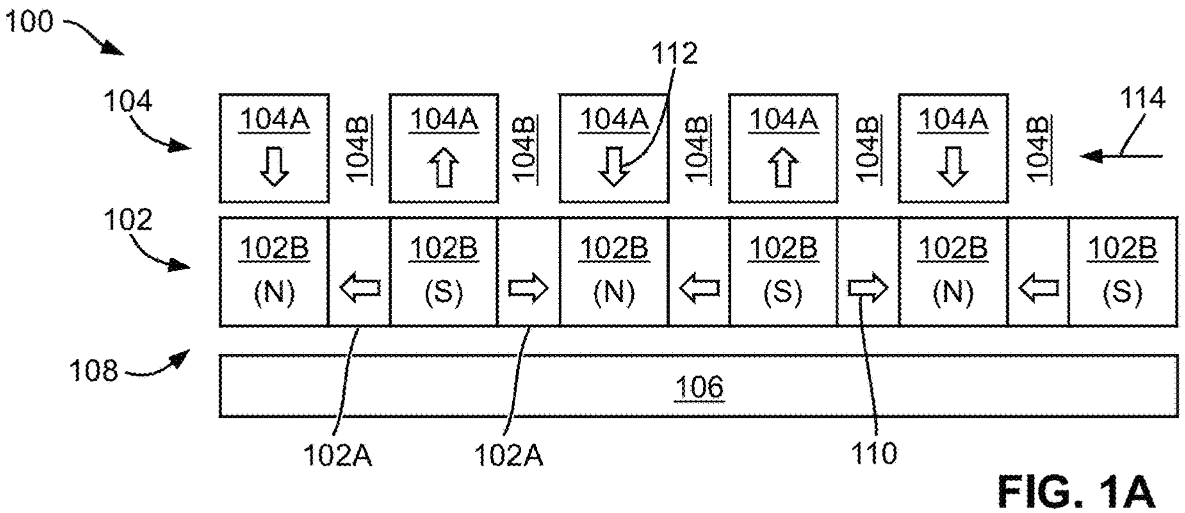
FIGS. 1A and 1B are schematic side views of a portion of an exemplary switchable magnetic apparatus, wherein the switchable magnetic apparatus comprises a front layer and a rear layer, and wherein the switchable magnetic apparatus is in an ON state in FIG. 1A and is in an OFF state in FIG. 1B.
Figure 1B:
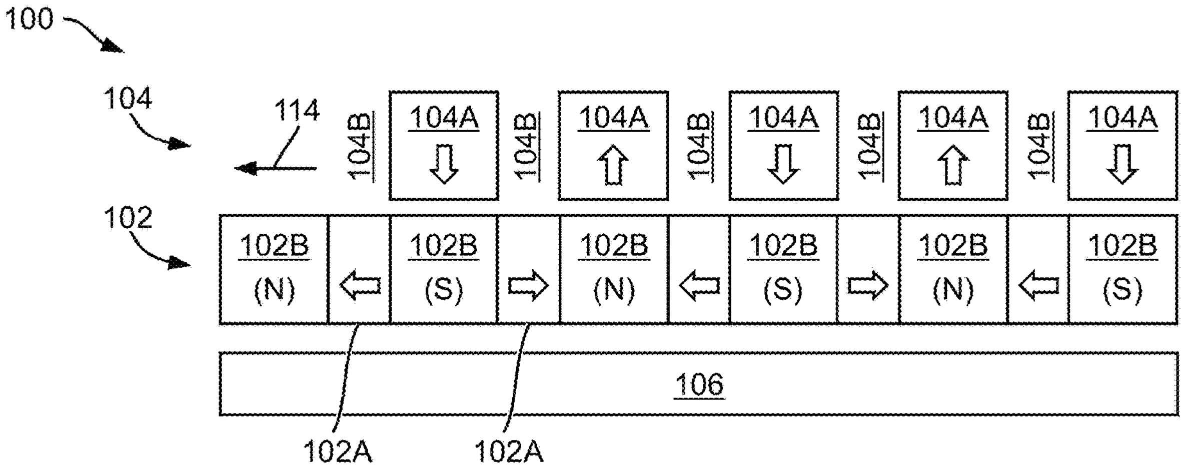

Before describing the switchable magnetic apparatuses with reduced switching force, a switchable magnetic apparatuses with no switch force reduction according to some embodiments of the present disclosure is shown in FIGS. 1A and 1B, and is generally identified using reference numeral 100. As shown, the switchable magnetic apparatus 100 comprises a stationary front layer 102 and a movable rear layer 104, and is switchable between an ON state (FIG. 1A) and an OFF state (FIG. 1B) by moving the movable rear layer 104 between an ON position as shown in FIG. 1A and a neighboring OFF position as shown in FIG. 1B. As shown in FIGS. 1A and 1B, the movable rear layer 104 may have a plurality of ON positions each may configure the switchable magnetic apparatus 100 to the ON state, and a plurality of OFF positions each may configure the switchable magnetic apparatus 100 to the OFF state.

When in the ON state, the switchable magnetic apparatus 100 enables or activates a magnetic field on the front side 108 for, for example, generating a magnetic force to attract an adjacent ferromagnetic or magnetic object or work-piece 106 at the front side thereof. The work-piece 106 is then demountably engaged with the switchable magnetic apparatus 100. When in the OFF state, the switchable magnetic apparatus 100 disables or deactivates the magnetic field on the front side 108 to disengage the work-piece 106 therefrom. Herein, the ferromagnetic or magnetic object or work-piece 106 refers to an object or work-piece that comprises one or more suitable ferromagnetic or magnetic materials and may optionally comprise one or more non-ferromagnetic materials.

The front layer 102 comprises one or more linearly positioned front-layer magnets 102A spaced by or interleaved with a plurality of ferromagnetic components 102B (also denoted ferromagnetic "blocks" without referring specific shapes thereof, and the terms "components" and "blocks" may be used interchangeably hereinafter). Those skilled in the art will appreciate that each ferromagnetic component or block 102B may have any suitable shape.

In these embodiments, the polarities of the front-layer magnets 102A are in the same plane such as the plane of the front layer 102 and alternating. In other words, the adjacent front-layer magnets 102A (which sandwich a ferromagnetic block 102B therebetween) have opposite polarities, as indicated by the arrows 110. Therefore, the adjacent front-layer magnets 102A have the same poles at adjacent ends thereof, and the adjacent front-layer magnets 102A magnetize the ferromagnetic block 102B sandwiched therebetween to a pole same as that at adjacent ends thereof.

The rear layer 104 comprises a plurality of linearly positioned rear-layer magnets 104A spaced by or interleaved with one or more non-ferromagnetic spacers 104B. The polarities of the rear-layer magnets 104A are perpendicular to the plane of the rear layer 104 and alternating. In other words, the polarities of the rear-layer magnets 104A are perpendicular to the polarities of the front-layer magnets 102A, and adjacent rear-layer magnets 104A (which sandwich a spacer 104B therebetween) have opposite polarities, as indicated by the arrows 112 representing a polarity from South pole to North pole.

The front-layer magnets 102A and rear-layer magnets 104A may be in any suitable shapes such as cubical shapes, cylindrical shapes, spherical shapes, arc segments, disks, and/or the like. The shapes of the front-layer magnets 102A may be the same or different. Similarly, the shapes of the rear-layer magnets 104A may be the same or different. Moreover, the shapes of the front-layer magnets 102A and the rear-layer magnets 104A may be the same or different.

The front-layer magnets 102A and rear-layer magnets 104A may be made of any suitable magnetic materials. For example, in some embodiments, the magnets 102A and 104A may be N52-grade magnets with rectangular cross-sections. In some other embodiments, the magnets 102A and 104A may comprise other permanent magnet materials such as NdFeB, NiCo, and/or the like. In some other embodiments, the magnets 102A and 104A may be electromagnets. The ferromagnetic blocks 102B may be made of any suitable ferromagnetic material such as steel. The one or more spacers 104B may preferably be one or more non-ferromagnetic blocks made of any suitable non-ferromagnetic materials such as aluminum, or simply gaps.

In any of the ON and OFF states, each rear-layer magnet 104A overlaps a ferromagnetic block 102B along the forward-rearward direction, and each spacer 104B overlaps a front-layer magnet 102A along the forward-rearward direction.

The polarities of each front-layer magnet 102A and the rear-layer magnets 104A adjacent thereof determine the state of the switchable magnetic apparatus 100. As those skilled in the art will appreciate, the magnetic force at the front side of the switchable magnetic apparatus 100 in the OFF state is substantively zero, or non-zero but much smaller than that in the ON state.

As shown in FIG. 1A, the switchable magnetic apparatus 100 is in the ON state when the rear layer 104 is moved to the ON position wherein the polarities of each front-layer magnet 102A and the rear-layer magnets 104A adjacent thereof are "opposite" to each other. In other words, the magnetic pole at an end of the front-layer magnet 102A is the same as that at an adjacent end of the adjacent rear-layer magnet 104A. More specifically, when the switchable magnetic apparatus 100 is in the ON state, each ferromagnetic block 102B is adjacent the same magnetic poles of the front-layer magnet 102A and the rear-layer magnet 104A (that is, the "south" poles or "north" poles thereof). In this arrangement, the rear-layer magnet 104A repels the front-layer magnets 102A thereby forcing the magnetic flux to extend out of the switchable magnetic apparatus 100 in a direction away from the front layer 102 and towards the work-piece 106.

As shown in FIG. 1B, the switchable magnetic apparatus 100 is in the OFF state when the rear layer 104 is moved to the OFF position wherein the polarities of each front-layer magnet 102A and the rear-layer magnets 104A adjacent thereof are "aligned" with each other. In other words, the magnetic pole at an end of the front-layer magnet 102A is different to that at an adjacent end of the adjacent rear-layer magnet 104A. More specifically, when the switchable magnetic apparatus 100 is in the OFF state, each ferromagnetic block 102B is adjacent different magnetic poles of the front-layer magnet 102A and the rear-layer magnet 104A (that is, the "south" pole of the front-layer magnet 102A and the "north" pole of the rear-layer magnet 104A, or the "north" pole of the front-layer magnet 102A and the "south" pole of the rear-layer magnet 104A). In this arrangement, the front-layer magnet 102A attracts the adjacent rear-layer magnets 104A, thereby effectively containing the magnetic flux in the switchable magnetic apparatus 100 and with a substantively reduced amount of flux extending out thereof. Subsequently, a substantively reduced magnetic force (or effectively zero magnetic force) is applied to the work-piece 106.

Although not shown, the switchable magnetic apparatus 100 also comprises a manipulation structure for switching the switchable magnetic apparatus 100 to between the ON and OFF states. For example, in some embodiments, the magnets 102A and/or 104A are electromagnets and the manipulation structure comprises one or more electromagnet controllers for changing the polarities of the magnets 102A and/or 104A by changing the direction of the current thereof.

In some other embodiments, the manipulation structure comprises actuators for moving and/or rotating the magnets 102A and/or 104A to change polarities thereof. The actuation may be conducted on the rear layer 104, the front layer 102, or a combination thereof. The actuation mechanism may include a housing to constrain the stationary magnets 102A/104A while linearly positioning, rotationally positioning, or rotating in position the actuated magnets. The actuation may be powered manually using a mechanical component such as a lever, electrically controlled using a device such as an electric motor, pneumatically controlled, or controlled by a combustion engine.

While the switchable magnetic apparatus 100, when in the ON state, generates a magnetic field on the front side thereof, those skilled in the art will appreciate that the front layer 102 also causes a magnetic field on the rear side thereof which may impact the movement of the rear layer 104.

Figure 2:
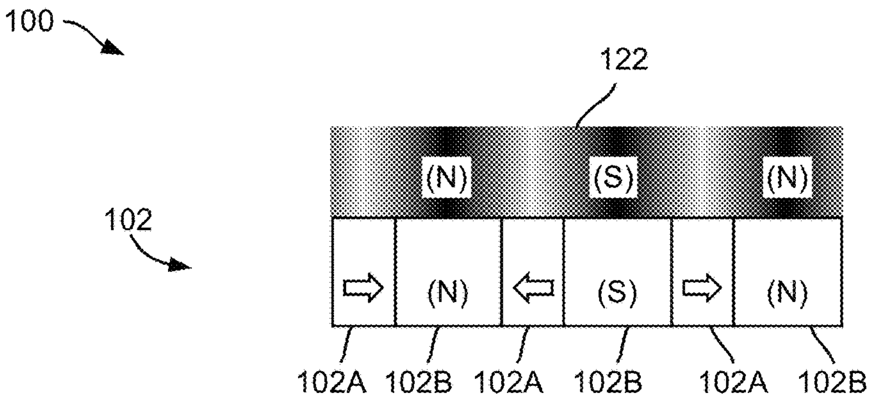
FIG. 2 shows the magnetic field caused by the front layer of the switchable magnetic apparatus shown in FIG. 1 on a rear side thereof.

FIG. 2 is a simplified schematic diagram showing the magnetic field 122 caused by the front layer 102 on the rear side thereof wherein the darkness thereof indicates the intensity of the magnetic field 122 along the rear surface of the front layer 102. While the intensity of the magnetic field 122 generally attenuates with the increase of the distance to the rear surface of the front layer 102, such an attenuation is not shown for ease of illustration. As can be seen from FIG. 2, the magnets 102A magnetize the ferromagnetic components 102B to South and North poles (represented by "(N)" and "(S)", respectively, wherein the brackets "( )" indicated that they are magnetized poles), and giving rise to the strongest intensities of the magnetic field 122 with same poles at locations adjacent thereof.

FIGS. 3A to 3E are simplified schematic diagrams of a portion of the switchable magnetic apparatus 100 showing the movement of the rear layer 104 from the OFF position to the ON position and the magnetic force the rear layer 104 bears during the movement. For ease of illustration, FIGS. 3A to 3E only show on rear-layer magnet 104A of the rear layer 104.

Figure 3A:
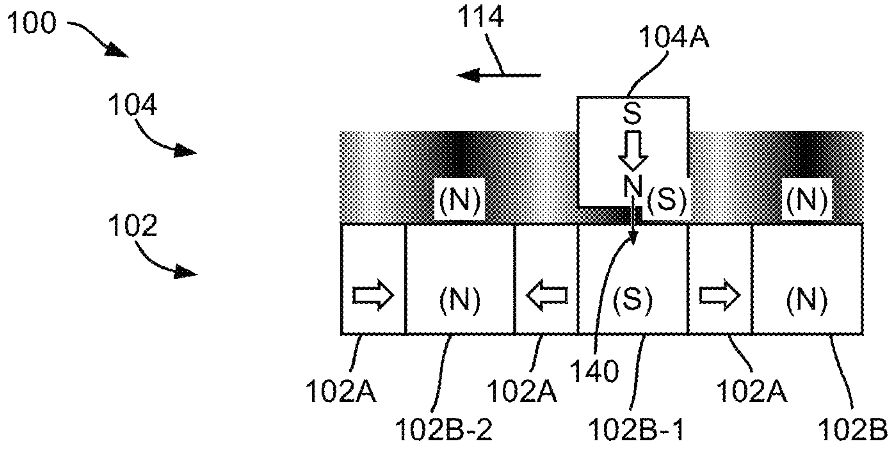
FIGS. 3A and 3E show an analysis of the magnetic force applied to a rear-layer magnet of the rear layer when the rear layer is moved from the OFF position to the ON position.

As shown in FIG. 3A, when the rear layer 104 is in OFF position, the rear-layer magnet 104A overlaps the ferromagnetic component 102B-1 and is at an adjacent position thereto substantially of the strongest magnetic field intensity. The rear-layer magnet 104A thereby bears a magnetic force 140 towards the front layer 102 with the overall magnetic force along the plane of the rear layer 104 being zero. As the rear layer 104 is supported along the forward-rearward direction (for example, by suitable constraining components (not shown in FIG. 3A)), the magnetic force applied to the rear layer 104 along the forward-rearward direction is not considered in the following description.

Figure 3B:
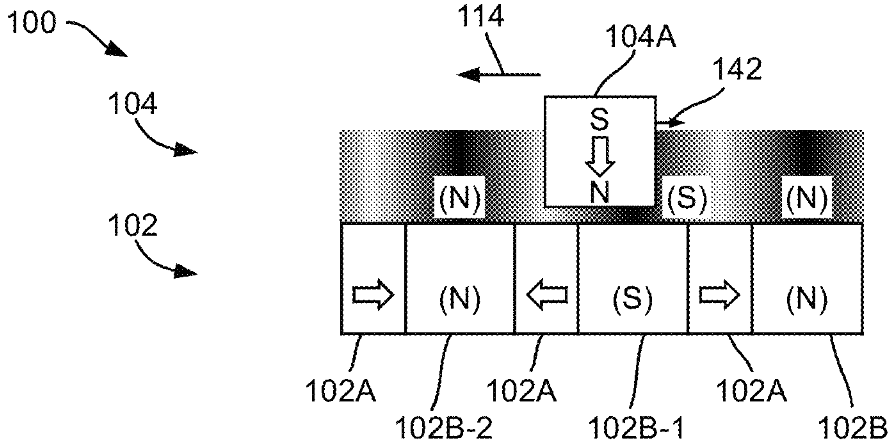

As shown in FIG. 3B, an actuation force (not shown) is applied to the rear layer 104 and starts to move the rear-layer magnet 104A from the OFF position to the ON position on its left-hand side. As the pole of the rear-layer magnet 104A and the magnetized pole of the ferromagnetic component 102B-1 at the adjacent ends thereof are opposite poles (for example, being the North and South poles, respectively), the rear-layer magnet 104A bears a magnetic force 142 pointing to the right-hand side (that is, attracting the rear-layer magnet 104A towards the strongest-magnetic-intensity location). As the direction of the magnetic force 142 is opposite to the moving direction 114, the actuation force has to overcome the magnetic force 142 to move the rear layer 104.

Figure 3C:
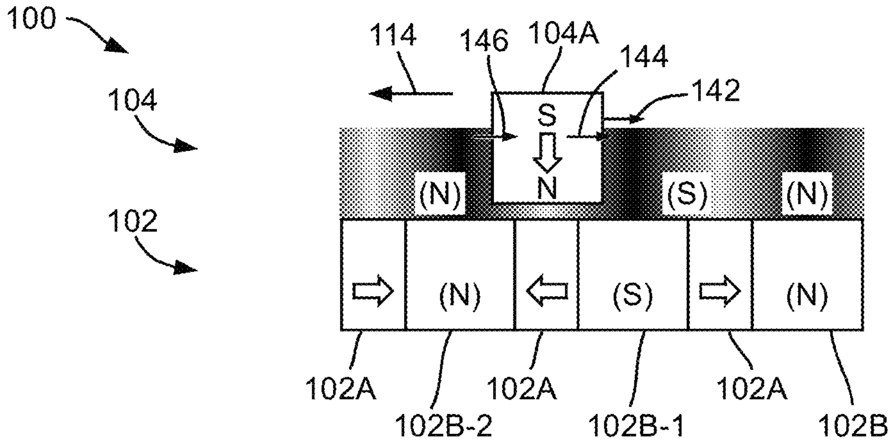

As shown in FIG. 3C, when the rear layer 104 and thus the rear-layer magnet 104A is further moved away from the ferromagnetic component 102B-1 and closer to the ferromagnetic component 102B-2 on the left-hand side thereof, the ferromagnetic component 102B-1 applies to the rear-layer magnet 104A an attractive force 144 pointing to the right-hand side thereof, and the ferromagnetic component 102B-2 (which has the same pole as the adjacent rear layer magnet 104A (for example, the North pole) at an adjacent end thereof) applies to the rear-layer magnet 104A a repelling force 146 also pointing to the right-hand side thereof. The rear-layer magnet 104A thus bears an overall magnetic force 142 (which is the summation of the forces 144 and 146) greater than that as in FIG. 3B. Subsequently, a larger actuation force is required to overcome the overall magnetic force 142 to move the rear layer 104.

Figure 3D:
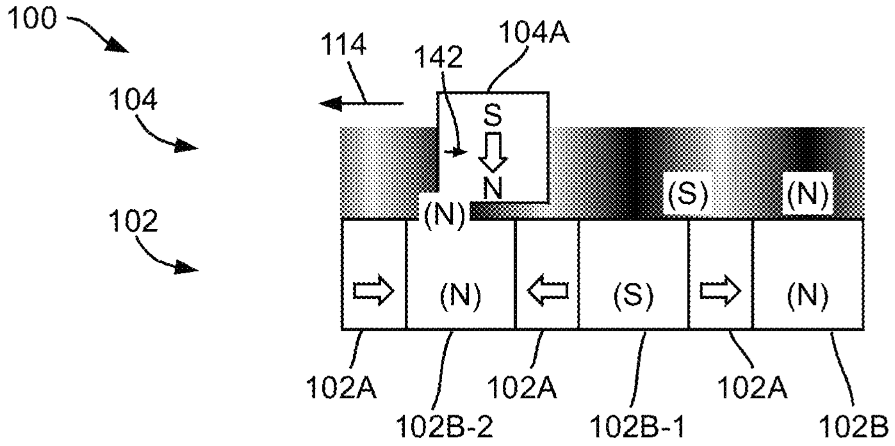
Figure 3E:
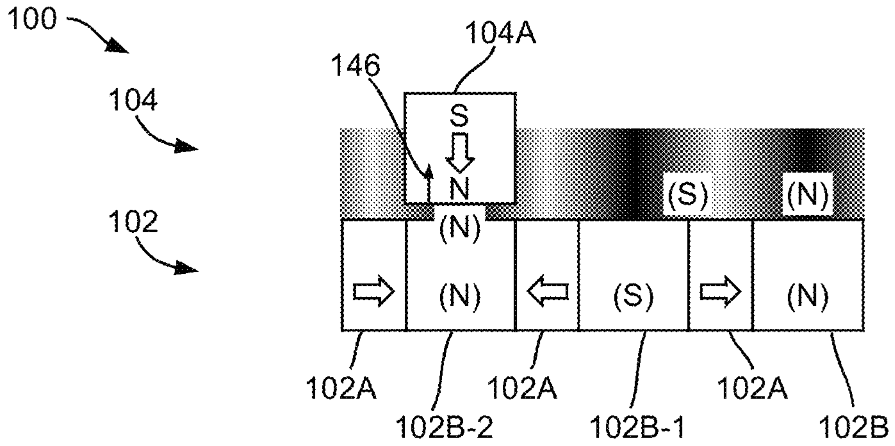

Thus, when the rear layer 104 is moved from the OFF position towards the ON position, the overall magnetic force 142 applied to the rear-layer magnet 104A (along the plane of the rear layer 104) increases with the increase of the distance from the OFF position until the rear-layer magnet 104A passed a peak location. As shown in FIG. 3D, the overall magnetic force 142 decreases with the increase of the distance from the OFF position and the decrease of the distance to the ON position (adjacent the ferromagnetic component 102B-2), until the rear-layer magnet 104A arrives the ON position. As shown in FIG. 3E, when the rear-layer magnet 104A is at the ON position, the rear-layer magnet 104A bears a magnetic force 146 away from the front layer 102 with the overall magnetic force along the plane of the rear layer 104 being zero.

Figure 4:
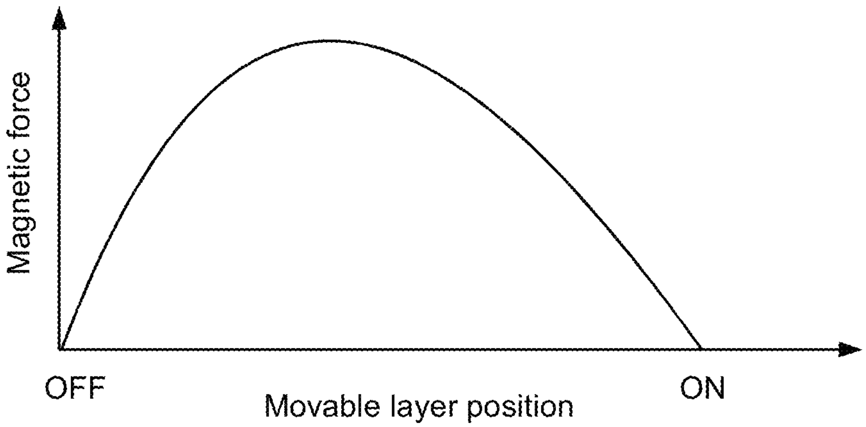
FIG. 4 shows curve of the magnetic force applied to a rear-layer magnet of the rear layer when the rear layer is moved from the OFF position to the ON position.

FIG. 4 shows the overall magnetic force 142 applied to the rear-layer magnet 104A (along the plane of the rear layer 104) when the rear-layer magnet 104A is at various positions with respect to the front layer position between the ON and OFF positions, wherein a positive overall magnetic force 142 represents the attractive force towards the OFF position, and a negative overall magnetic force 142 (not exhibited in FIG. 4) represents the repelling force from the OFF position (or, the attractive force towards the ON position). Actuating the rear layer 104 from the OFF position to the ON position generally requires overcoming the overall magnetic force 142.

Figure 5A:
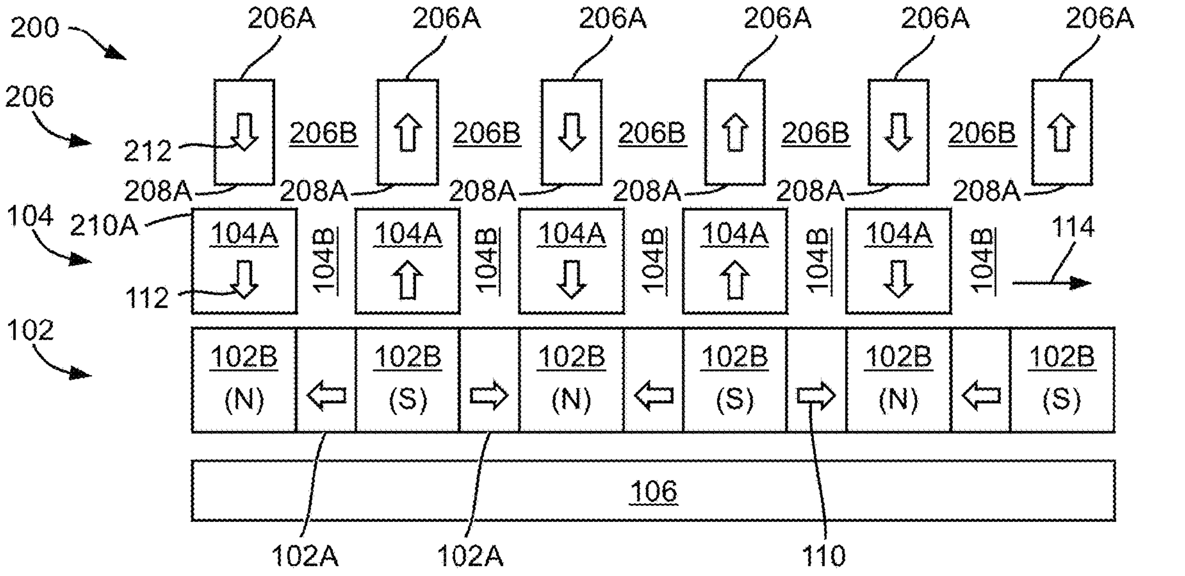
FIGS. 5A and 5B are schematic side views of an exemplary switching-force-reduced switchable magnetic apparatus according to some embodiments of the present disclosure, wherein the switchable magnetic apparatus comprises a front layer, a rear layer and a force-reduction layer on the rear side of the rear layer, and wherein the switching-force-reduced switchable magnetic apparatus is in an ON state in FIG. 5A and is in an OFF state in FIG. 5B.
Figure 5B:
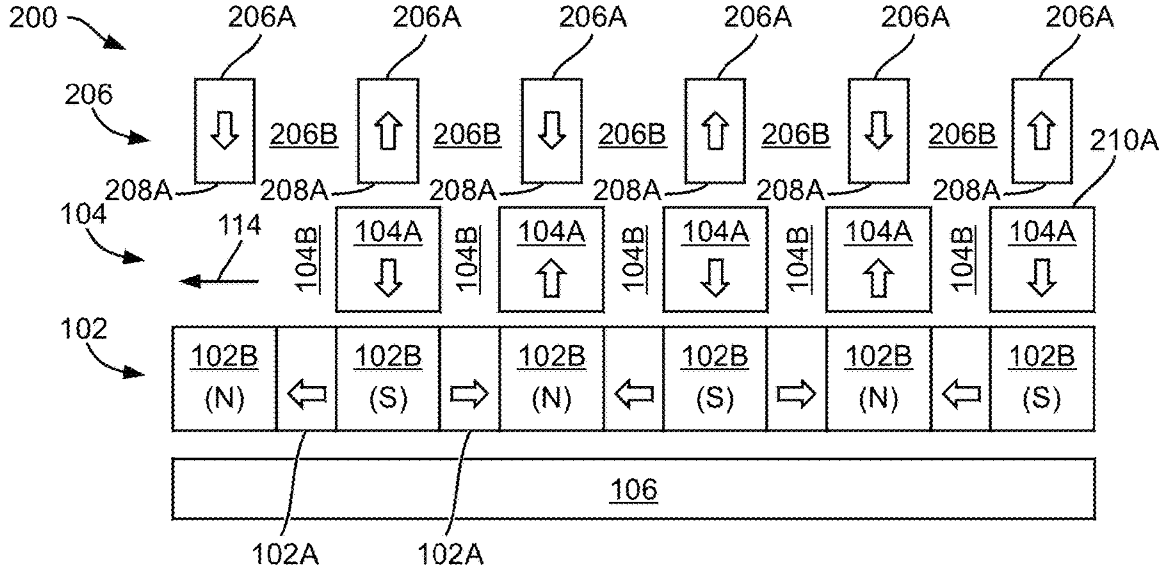

FIGS. 5A and 5B show a switching-force-reduced switchable magnetic apparatus 200 in the ON state and OFF state, respectively, according to some embodiments of this disclosure. The switching-force-reduced switchable magnetic apparatus 200 comprises a front layer 102 same as the front layer 102 shown in FIGS. 1A and 1B, a movable rear layer 104 same as the rear layer 104 shown FIGS. 1A and 1B, and a force-reduction layer 206 on the rear side of the rear layer 104.

The force-reduction rear layer 206 comprises a plurality of linearly positioned force-reduction magnets 206A spaced by or interleaved with one or more non-ferromagnetic spacers 206B. The one or more spacers 206B may preferably be one or more non-ferromagnetic blocks made of any suitable non-ferromagnetic materials such as aluminum, or simply gaps. The polarities of the force-reduction magnets 206A are perpendicular to the plane of the force-reduction rear layer 206 such that a first pole 208A of each force-reduction magnet 206A is adjacent a pole 210A of an adjacent magnet 104A of the rear layer 104 for reducing the force required to switch the switching-force-reduced switchable magnetic apparatus 200 between the ON state and the OFF state.

As shown in FIG. 5A, when the switching-force-reduced switchable magnetic apparatus 200 is in the ON state and the rear layer 104 is at an ON position, each force-reduction magnet 206A overlaps a corresponding rear-layer magnet 104A that has the same polarity as indicated by the arrows 112 and 212 representing a polarity from South pole to North pole (that is, the adjacent ends thereof have opposite poles) such that the first pole 208A of each force-reduction magnet 206A and the pole 210A of the adjacent rear-layer magnet 104A are opposite poles.

As shown in FIG. 5B, when the switching-force-reduced switchable magnetic apparatus 200 is in the OFF state and the rear layer 104 is at an OFF position, each force-reduction magnet 206A overlaps a corresponding rear-layer magnet 104A that has opposite polarities (that is, the adjacent ends thereof have the same poles) such that the first pole 208A of each force-reduction magnet 206A and the pole 210A of the adjacent rear-layer magnet 104A are the same poles.

Those skilled in the art will appreciate that, the poles 208 on the front side of the force-reduction layer 206 overlap respective poles on the rear side of the front layer 102 and are same poles thereof.

Figure 6A:
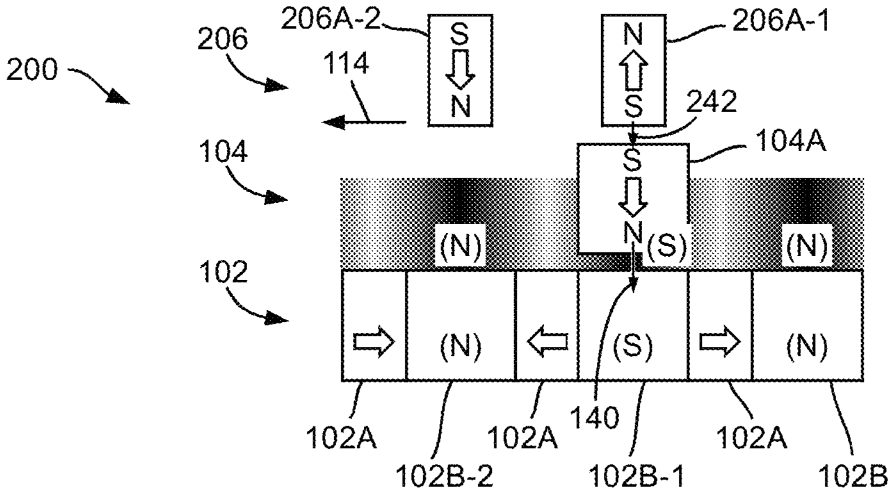
FIGS. 6A to 6C show an analysis of the magnetic force applied to a rear-layer magnet of the rear layer of a the switching-force-reduced switchable magnetic apparatus when the rear layer is moved from the OFF position towards the ON position.

As shown in FIG. 6A, when the rear layer 104 is in OFF position, the rear-layer magnet 104A overlaps the ferromagnetic component 102B-1 of the front layer 102 and the force-reduction magnet 206A-1 of the force-reduction rear layer 206. The rear-layer magnet 104A thus bears an attractive magnetic force 140 caused by the ferromagnetic component 102B-1 and a repelling magnetic force 242 caused by the force-reduction magnet 206A-1 with both forces 140 and 242 pointing towards the front layer 102. The overall magnetic force applied to the rear-layer magnet 104A along the plane of the rear layer 104 is then zero. As the rear layer 104 is supported along the forward-rearward direction (for example, by the constraining components), the magnetic force applied to the rear layer 104 along the forward-rearward direction is not considered in the following description.

Figure 6B:
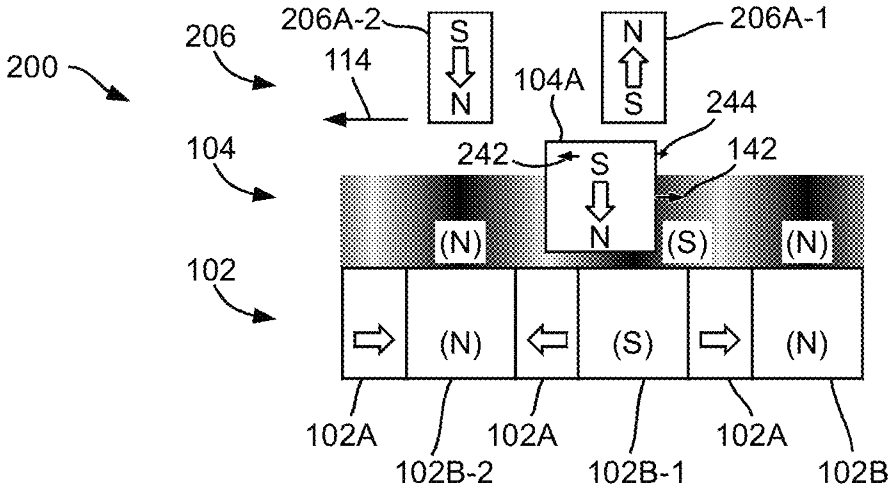

As shown in FIG. 6B, an actuation force (not shown) is applied to the rear layer 104 and starts to move the rear-layer magnet 104A from the OFF position to the ON position on its left-hand side (indicated by the arrow 114). As the poles of the rear-layer magnet 104A and the magnetized pole of the ferromagnetic component 102B-1 at the adjacent ends thereof are opposite poles (for example, being the North and South poles, respectively), the rear-layer magnet 104A bears a magnetic force 142 applied by the ferromagnetic component 102B-1 pointing to the right-hand side (that is, opposite to the moving direction 114). On the other hand, as the poles of the rear-layer magnet 104A and the force-reduction magnet 206A-1 at the adjacent ends thereof are same poles (for example, both being the South poles), the rear-layer magnet 104A bears a magnetic force 242 applied by the force-reduction magnet 206A-1 pointing to the left-hand side (that is, same as the moving direction 114). Depending on the magnetic characteristics of the force-reduction magnet 206A-1 (for example, the magnetic flux density thereof), the overall magnetic force 244 (which is the difference of the magnetic forces 142 and 242) may be a reduced magnetic force pointing to the right-hand side (if the magnetic force 142 is greater than the magnetic force 242), a reduced magnetic force pointing to the left-hand side (if the magnetic force 142 is smaller than the magnetic force 242), or a zero force (if the magnetic force 142 is equal to the magnetic force 242). In FIG. 6B, the overall magnetic force 244 is shown as a reduced magnetic force pointing to the right-hand side (that is, opposite to the moving direction 114).

Figure 6C:
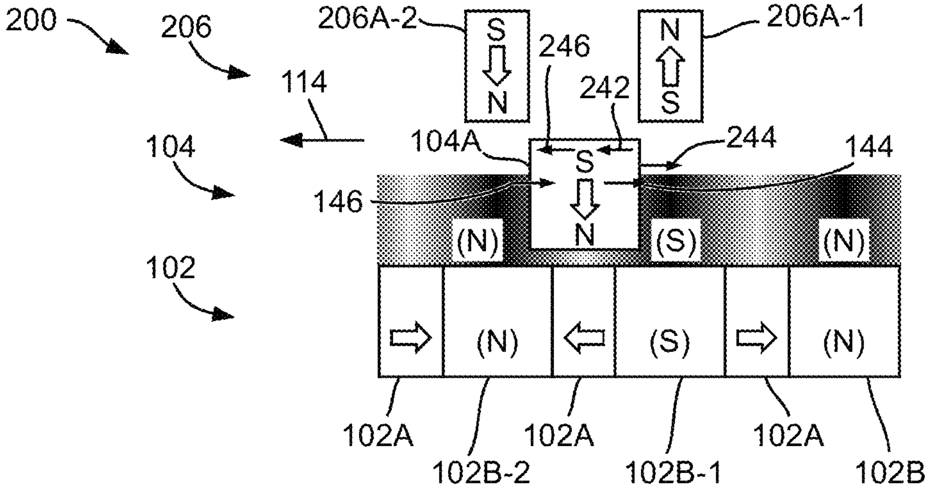

As shown in FIG. 6C, when the rear layer 104 and thus the rear-layer magnet 104A is further moved away from the ferromagnetic component 102B-1 and the force-reduction magnet 206A-1, and closer to the ferromagnetic component 102B-2 and force-reduction magnet 206A-2 on the left-hand side thereof, the rear-layer magnet 104A bears the following magnetic forces:

- a magnetic force 144 applied by the ferromagnetic component 102B-1 pointing to the right-hand side;
- a magnetic force 146 applied by the ferromagnetic component 102B-2 pointing to the right-hand side;
- a magnetic force 242 applied by the force-reduction magnet 206A-1 pointing to the left-hand side; and
- a magnetic force 246 applied by the force-reduction magnet 206A-2 pointing to the left-hand side.

The overall magnetic force 242 applied to the rear-layer magnet 104A is the difference of the summation of the magnetic forces 144 and 146 and the summation of the magnetic forces 242 and 246) which is smaller than the summation of the magnetic forces 144 and 146.

Thus, when the rear layer 104 is moved from the OFF position towards the ON position, the overall magnetic force 242 applied to the rear-layer magnet 104A (along the plane of the rear layer 104) is generally reduced (that is, being a smaller magnetic force against the moving direction 114 or even being a magnetic force aligning with the moving direction 114).

Figure 7:
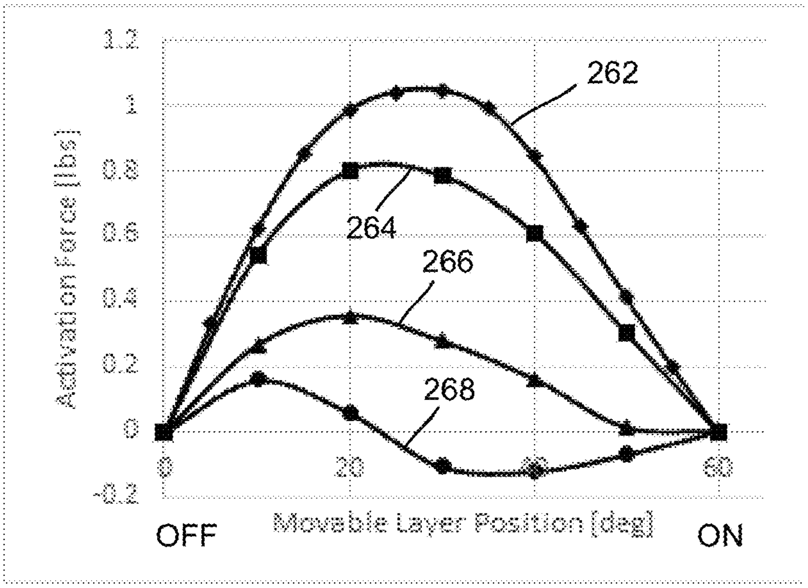
FIG. 7 shows curves of the magnetic forces applied to the rear-layer magnets of the rear layer of a switching-force-reduced switchable magnetic apparatus when the rear layer is moved from the OFF position to the ON position.

FIG. 7 shows the simulation results of the overall magnetic forces 142 applied to the rear-layer magnet 104A (along the plane of the rear layer 104) when the rear-layer magnet 104A is at various positions with respect to the front layer position between the ON and OFF positions, wherein a positive overall magnetic force 142 represents the attractive force towards the OFF position, and a negative overall magnetic force 142 represents the repelling force from the OFF position (or, the attractive force towards the ON position). In the simulation, the rear layer 104 comprises six (6) rear-layer magnets 104A arranged in a circular pattern (see FIG. 8). Therefore, the angular distance between the ON and OFF positions is 60°.

The curve 262 represents the overall magnetic force 142 when no force-reduction rear layer 206 is used. As shown in FIG. 7, the maximum magnetic force 142 of the curve 262 is 1.05 lbs.

The curves 264 to 268 represent the overall magnetic forces 142 obtained using different characteristics of the force-reduction magnets 206A (for example, different magnetic flux densities).

The curve 264 is obtained using a set of force-reduction magnets 206A with small magnetic flux densities, giving rise to a small switching force reduction.

The curve 266 is obtained using a set of force-reduction magnets 206A with non-optimized magnetic flux densities. While the magnetic force is further reduced, the rear layer 104 at the ON state is still unstable. In other words, if the rear layer magnet 104A is not exactly in the ON position, it will experience an overall repulsive force away from the ON position.

The curve 268 is obtained using a set of force-reduction magnets 206A with optimized magnetic flux densities. The maximum magnetic force 142 of the curve 268 is 0.16 lbs, exhibiting a switching force reduction (compared to the curve 262) by a factor of over six (6) times. Moreover, the ON state is now stable as moving the rear layer 104 from the ON position requires to overcome an overall magnetic force towards the ON position.

Figure 8A:
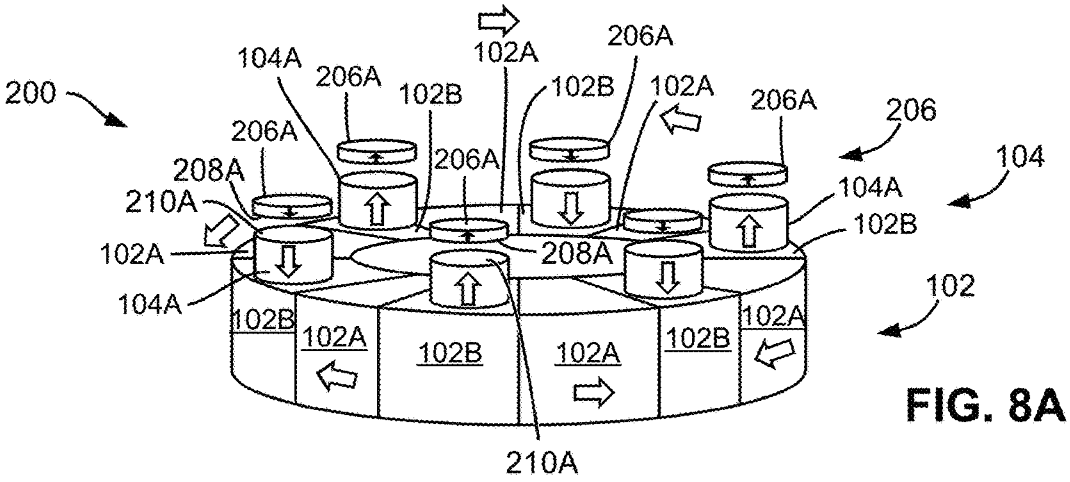
FIGS. 8A and 8B are schematic side views of an exemplary switching-force-reduced switchable magnetic apparatus according to some embodiments of the present disclosure, wherein the switchable magnets of the front, rear, and force-reduction layers are arranged in a circular pattern, and wherein the switching-force-reduced switchable magnetic apparatus is in the ON state in FIG. 8A and is in the OFF state in FIG. 9B.
Figure 8B:
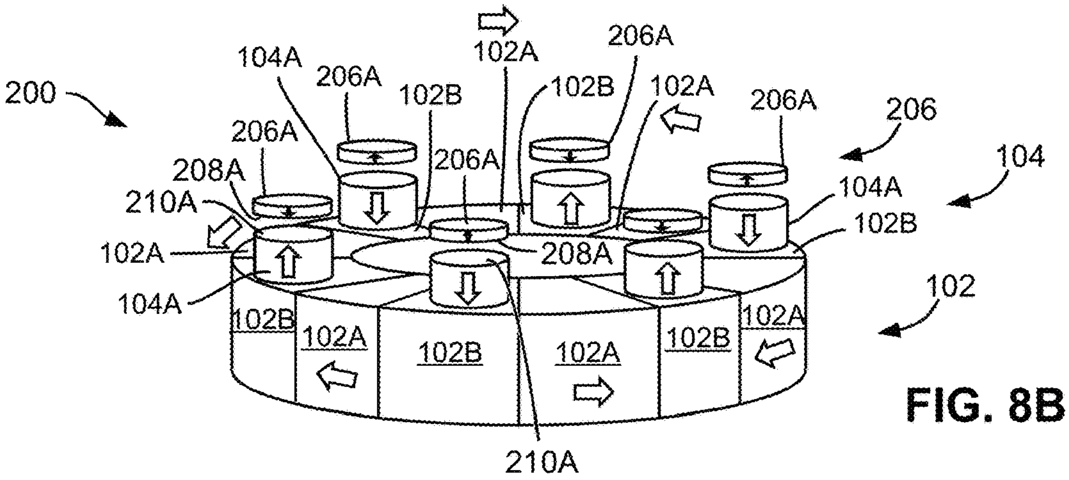

Although in above embodiments, the magnets of the front, rear, and force-reduction layers 102, 104, and 206 are arranged in a linear pattern, in other embodiments, the magnets of the front, rear, and force-reduction layers 102, 104, and 206 may be arranged in any other suitable patterns. For example, as shown in FIGS. 8A and 8B, wherein the switching-force-reduced switchable magnetic apparatus 200 is in the ON state in FIG. 8A and in the OFF state in FIG. 8B, the magnets of the front, rear, and force-reduction layers 102, 104, and 206 may be arranged in circular patterns.

The polarities of the force-reduction magnets 206A are perpendicular to the plane of the force-reduction rear layer 206 such that a first pole 208A of each force-reduction magnet 206A is adjacent a pole 210A of an adjacent magnet 104A of the rear layer 104 for reducing the force required to switch the switching-force-reduced switchable magnetic apparatus 200 between the ON state and the OFF state.

When the switching-force-reduced switchable magnetic apparatus 200 is in the ON state and the rear layer 104 is at the ON position (FIG. 8A), the first pole 208A of each force-reduction magnet 206A and the pole 210A of the adjacent rear-layer magnet 104A are opposite poles.

When the switching-force-reduced switchable magnetic apparatus 200 is in the OFF state and the rear layer 104 is at the OFF position (FIG. 8B), the first pole 208A of each force-reduction magnet 206A and the pole 210A of the adjacent rear-layer magnet 104A are the same poles.

Figure 9A:
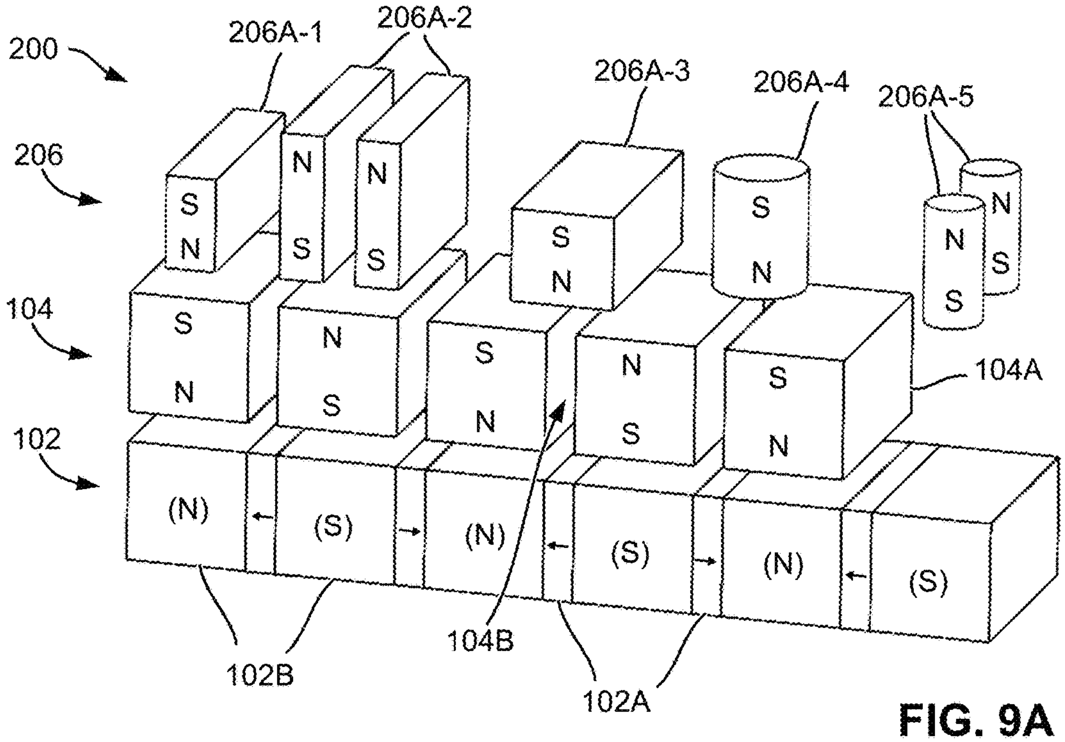
FIGS. 9A and 9B are schematic side views of an exemplary switching-force-reduced switchable magnetic apparatus according to yet some embodiments of the present disclosure, wherein the switchable magnetic apparatus comprises a front layer, a rear layer and a force-reduction layer on the rear side of the rear layer, and wherein the switching-force-reduced switchable magnetic apparatus is in an ON state in FIG. 9A and is in an OFF state in FIG. 9B.
Figure 9B:
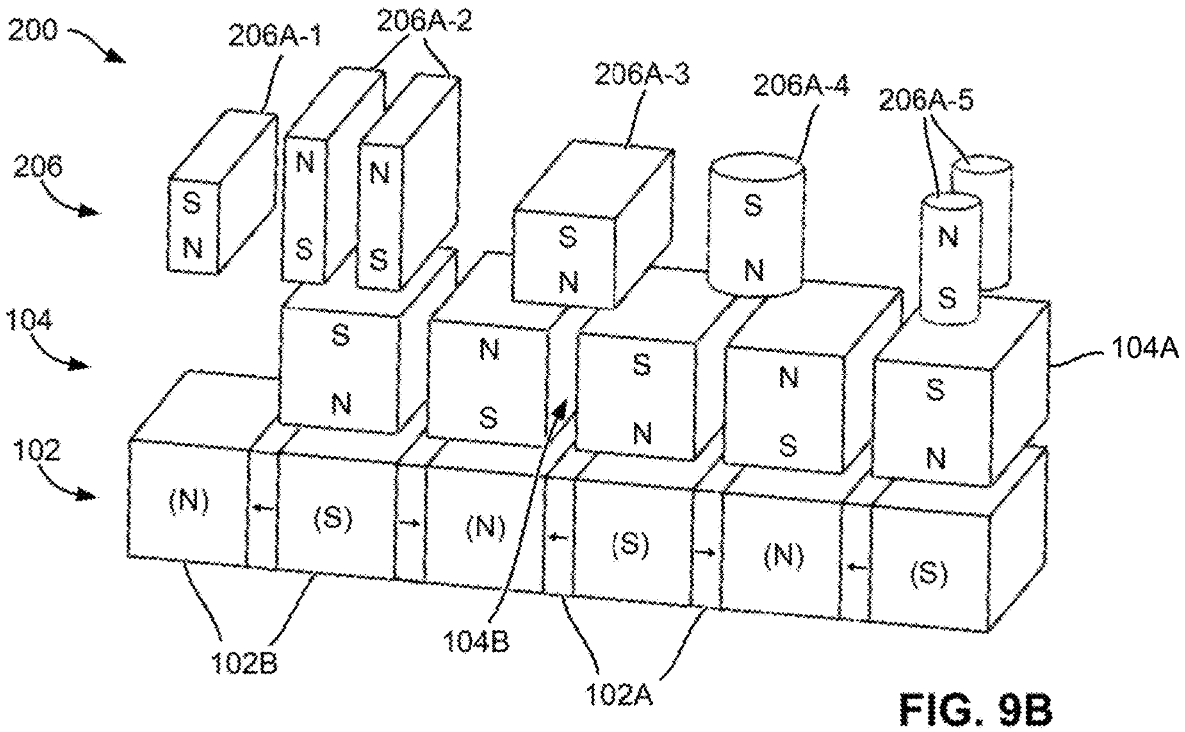

Although in above embodiments, each force-reduction magnet 206A overlaps a corresponding rear-layer magnet 104A, in other embodiments, the force-reduction magnets 206A may have various shapes and/or pieces, and may be located at any suitable positions. For example, as shown in FIGS. 9A (ON state) and 9B (OFF state), a force-reduction magnet 206A may be a single-piece, cubical-shaped magnet (see 206A-1, 206A-3), a single-piece, cylindrical-shaped magnet, a multiple-piece, cubical-shaped magnet (see 206A-2), a multiple-piece, cylindrical-shaped magnet (see 206A-4), or the like. A force-reduction magnet 206A may be positioned such that its pole is fully aligned with a pole of a rear-layer magnet 104A in the ON or OFF state (see 206A-1, 206A-4), or substantially aligned with a pole of a rear-layer magnet 104A in the ON or OFF state (see 206A-2, 206A-3; that is, a majority of a pole of the force-reduction magnet 206A-2, 206A-3 is aligned with a pole of a rear-layer magnet 104A in the ON or OFF state). Moreover, some rear-layer magnet 104A may not correspond to or otherwise overlap with the majority of a pole of any force-reduction magnet 206A in the ON or OFF state.

In some embodiments, the force-reduction layer 206 may also comprise one or more force-compensation magnets as needed with positioned between two adjacent poles of the rear layer 104 (see 207 in FIGS. 9A and 9B) in the ON or OFF state for compensating for the forces applied by one or more force-reduction magnets 206A.

Figure 10A:
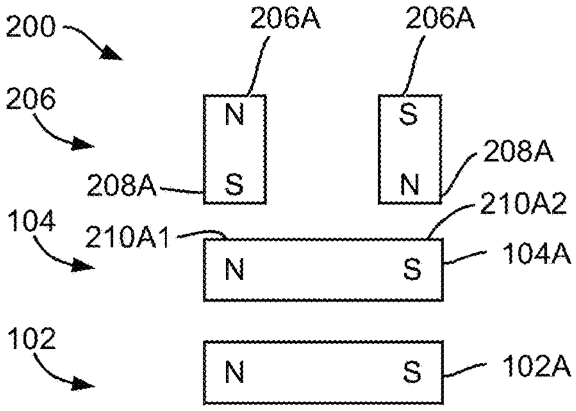
FIGS. 10A and 10B are schematic side views of a switching-force-reduced switchable magnetic apparatus in the ON state (FIG. 10A) and the OFF state (FIG. 10B), according to still some other embodiments of the present disclosure.
Figure 10B:
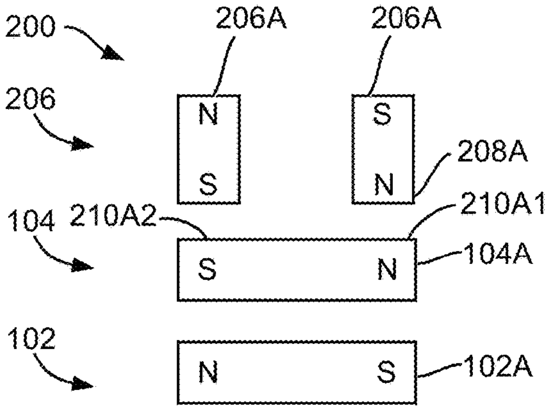

In some embodiments, the front layer 102 and rear layer 104 may each comprise one or more magnets with polarities parallel to the plane of the rear layer 104. FIGS. 10A (ON state) and 10B (OFF state) show an example wherein the magnets 102A and 104A of the front and rear layers 102 and 104 are arranged in a linear pattern and have parallel polarities. Therefore, each rear-layer magnet 104A has two poles 210A1 and 210A2 (collectively identified using reference numeral 210) adjacent the force-reduction layer 206.

The polarities of the force-reduction magnets 206A are perpendicular to the plane of the force-reduction rear layer 206 such that a first pole 208A of each force-reduction magnet 206A is adjacent a pole 210A (being 210A1 or 210A2) of an adjacent magnet 104A of the rear layer 104 for reducing the force required to switch the switching-force-reduced switchable magnetic apparatus 200 between the ON state and the OFF state.

When the switching-force-reduced switchable magnetic apparatus 200 is in the ON state and the rear layer 104 is at the ON position (FIG. 10A), the first pole 208A of each force-reduction magnet 206A and the adjacent pole 210A of the adjacent rear-layer magnet 104A are opposite poles.

When the switching-force-reduced switchable magnetic apparatus 200 is in the OFF state and the rear layer 104 is at the OFF position (FIG. 10A), the first pole 208A of each force-reduction magnet 206A and the adjacent pole 210A of the adjacent rear-layer magnet 104A are the same poles.

Figure 11A:
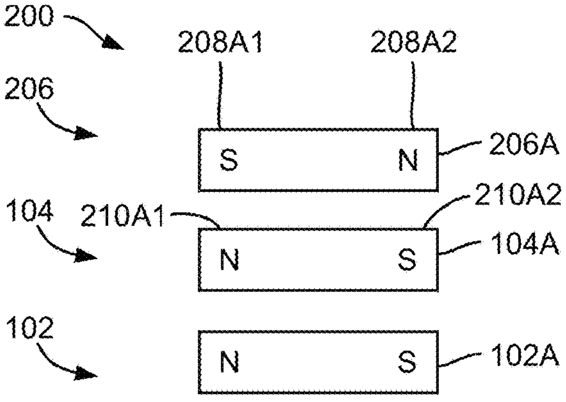
FIGS. 11A and 11B are schematic side views of a switching-force-reduced switchable magnetic apparatus in the ON state (FIG. 11A) and the OFF state (FIG. 11B), according to some other embodiments of the present disclosure.
Figure 11B:
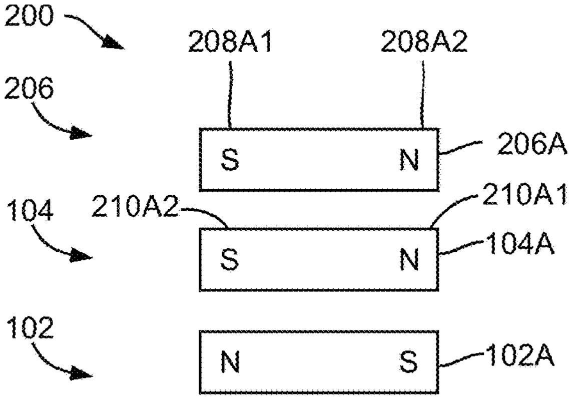

FIGS. 11A (ON state) and 11B (OFF state) show another example wherein the magnets 102A and 104A of the front and rear layers 102 and 104 are arranged in a linear pattern and have parallel polarities. Therefore, each rear-layer magnet 104A has two poles 210A1 and 210A2 (collectively identified using reference numeral 210) adjacent the force-reduction layer 206.

The polarities of the force-reduction magnets 206A are in parallel to the plane of the force-reduction rear layer 206 such that the first and second poles 208A1 and 208A2 (collectively identified using reference numeral 208) of each force-reduction magnet 206A are adjacent the poles 210A1 and 210A2 of an adjacent magnet 104A of the rear layer 104 for reducing the force required to switch the switching-force-reduced switchable magnetic apparatus 200 between the ON state and the OFF state.

When the switching-force-reduced switchable magnetic apparatus 200 is in the ON state and the rear layer 104 is at the ON position (FIG. 11A), the first pole 208A1 of each force-reduction magnet 206A and the adjacent pole 210A1 of the adjacent rear-layer magnet 104A are opposite poles. Moreover, the second pole 208A2 of each force-reduction magnet 206A and the adjacent pole 210A2 of the adjacent rear-layer magnet 104A are also opposite poles.

When the switching-force-reduced switchable magnetic apparatus 200 is in the OFF state and the rear layer 104 is at the OFF position (FIG. 11A), the first pole 208A1 of each force-reduction magnet 206A and the adjacent pole 210A1 of the adjacent rear-layer magnet 104A are the same poles. Moreover, the second pole 208A2 of each force-reduction magnet 206A and the adjacent pole 210A2 of the adjacent rear-layer magnet 104A are also the same poles.

Figure 12A:
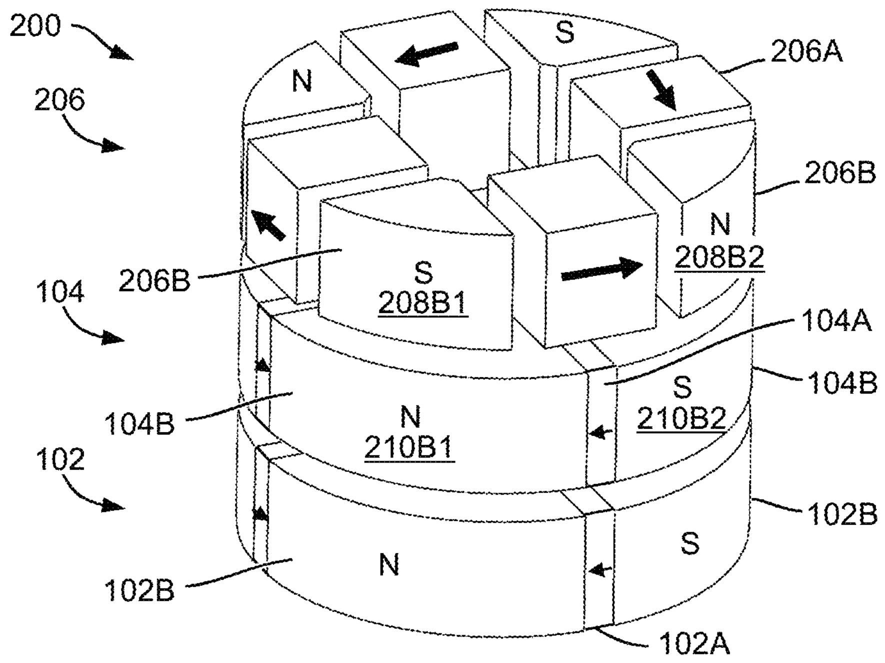
FIGS. 12A and 12B are schematic side views of a switching-force-reduced switchable magnetic apparatus in the ON state (FIG. 12A) and the OFF state (FIG. 12B), according to some other embodiments of the present disclosure.
Figure 12B:
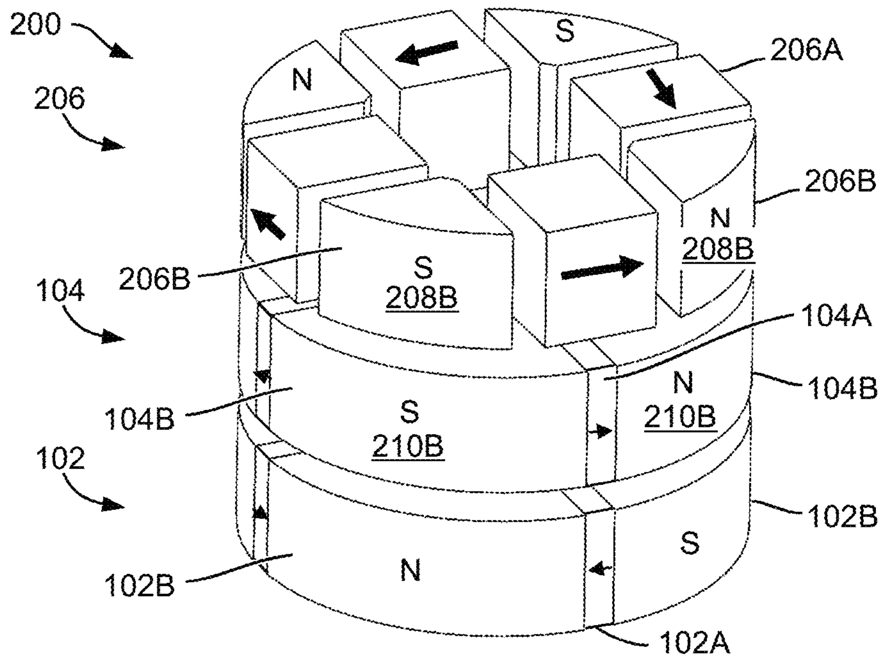

FIGS. 12A (ON state) and 12B (OFF state) show another example wherein the magnets of the front and rear layers 102 and 104 are arranged in a circular pattern. The magnets 102A and 104A of the front and rear layers 102 and 104 have parallel polarities. Each adjacent pair of the rear-layer magnets 104A have opposite polarities and sandwich therebetween a ferromagnetic block 104B. Therefore, the rear-layer magnets 104A magnetize the ferromagnetic blocks 104B and cause alternating poles 210B thereon adjacent the force-reduction layer 206.

The polarities of the force-reduction magnets 206A are in parallel to the plane of the force-reduction rear layer 206. Each adjacent pair of the force-reduction magnets 206A have opposite polarities and sandwich therebetween a ferromagnetic block 206B. Therefore, the force-reduction magnets 206A magnetize the ferromagnetic blocks 206B and cause alternating poles 208B thereon adjacent the rear layer 104.

When the switching-force-reduced switchable magnetic apparatus 200 is in the ON state and the rear layer 104 is at the ON position (FIG. 12A), the pole 208B of each ferromagnetic block 206B of the force-reduction layer 206 and the adjacent pole 210B of the adjacent ferromagnetic block 104B of the rear layer 104 are opposite poles.

When the switching-force-reduced switchable magnetic apparatus 200 is in the OFF state and the rear layer 104 is at the OFF position (FIG. 12A), the pole 208B of each ferromagnetic block 206B of the force-reduction layer 206 and the adjacent pole 210B of the adjacent ferromagnetic block 104B of the rear layer 104 are the same poles.

Although embodiments have been described above with reference to the accompanying drawings, those of skill in the art will appreciate that variations and modifications may be made without departing from the scope thereof as defined by the appended claims.

What is claimed is:

1. A switchable magnetic apparatus comprising:

a first layer comprising a set of one or more first-layer magnets;

a second layer on a rear side of the first layer, the second layer comprising a set of one or more second-layer magnets; and a third layer on a rear side of the second layer, the third layer comprising a set of one or more third-layer magnets;

wherein the first and second layers being movable relative to each other for switching the switchable magnetic apparatus between an ON state and an OFF state;

wherein the one or more second-layer magnets form a plurality of alternating second-layer poles adjacent the third layer;

wherein the one or more third-layer magnets form one or more third-layer poles adjacent the second layer for reducing a force to switch the switchable magnetic apparatus between the ON state and the OFF state;

wherein when in the ON state, at least a majority of each third-layer pole is aligned with a first one of the second-layer poles, and each third-layer pole and the corresponding second-layer pole aligned therewith are opposite poles; and wherein when in the OFF state, at least a majority of each third-layer pole is aligned with a second one of the second-layer poles, and each third-layer pole and the corresponding second-layer pole aligned therewith are same poles.

2. The switchable magnetic apparatus of claim 1, wherein one of the one or more third-layer magnets is a single-piece magnet.

3. The switchable magnetic apparatus of claim 1, wherein one of the one or more third-layer magnets comprises a plurality of magnet pieces.

4. The switchable magnetic apparatus of claim 1, wherein each set of the one or more first-layer magnets, the one or more second-layer magnets, and the one or more third-layer magnets are linearly positioned.

5. The switchable magnetic apparatus of claim 1, wherein each set of the one or more first-layer magnets, the one or more second-layer magnets, and the one or more third-layer magnets are circularly positioned.

6. The switchable magnetic apparatus of claim 1, wherein the first and second layers are linearly movable relative to each other.

7. The switchable magnetic apparatus of claim 1, wherein a polarity of each of the one or more first-layer magnets is parallel to the first layer.

8. The switchable magnetic apparatus of claim 7, wherein the first layer comprises a plurality of first-layer magnets, and adjacent pairs of the plurality of first-layer magnets have opposite polarities.

9. The switchable magnetic apparatus of claim 8, wherein the plurality of first-layer magnets are interleaved with a plurality of ferromagnetic blocks.

10. The switchable magnetic apparatus of claim 8, wherein a polarity of each of the one or more second-layer magnets is perpendicular to the polarities of the plurality of first-layer magnets, and adjacent second-layer magnets have opposite polarities.

11. The switchable magnetic apparatus of claim 10, wherein the plurality of second-layer magnets are interleaved with a plurality of non-ferromagnetic spacers.

12. The switchable magnetic apparatus of claim 7, wherein a polarity of each of the one or more second-layer magnets is parallel to the second layer.

13. The switchable magnetic apparatus of claim 12, wherein a polarity of each of the one or more third-layer magnets is perpendicular to the third layer.

14. The switchable magnetic apparatus of claim 12, wherein a polarity of each of the one or more third-layer magnets is parallel to the third layer.

15. The switchable magnetic apparatus of claim 1, wherein the third layer comprising one or more additional magnets each positioned between two adjacent poles of the second layer.

16. The switchable magnetic apparatus of claim 1, wherein the one or more first-layer magnets, the one or more second-layer magnets, and the one or more third-layer magnets comprise one or more permanent magnets.

17. A switchable magnetic apparatus comprising:

a first layer comprising one or more first-layer magnets;

a second layer on a rear side of the first layer, the second layer comprising one or more second-layer magnets, the first and second layers being movable relative to each other between an ON position and an OFF position for switching the switchable magnetic apparatus between an ON state and an OFF state; and a third layer on a rear side of the second layer;

wherein the third layer comprises one or more third-layer magnets for applying a first force to the one or more second-layer magnets when the second layer is at a position intermediate the ON and OFF positions; and wherein the first force is at a direction opposite to a second force applied to the one or more second-layer magnets by the first-layer magnets when the second layer is at the position intermediate the ON and OFF positions.

18. A switchable magnetic apparatus comprising:

a front layer comprising one or more front-layer magnets interleaved with a plurality of ferromagnetic blocks, the polarities of the one or more front-layer magnets being in a same plane and adjacent pairs of the one or more front-layer magnets having opposite polarities;

a rear layer on a rear side of the front layer, the rear layer comprising a plurality of rear-layer magnets interleaved with a plurality of spacers, the polarities of the rear-layer magnets being perpendicular to the polarities of the one or more front-layer magnets, and adjacent rear-layer magnets having opposite polarities, the front and rear layers being movable relative to each other for switching the switchable magnetic apparatus between an ON state and an OFF state; and a switching-force-reduction layer on a rear side of the rear layer, the switching-force-reduction layer comprising one or more force-reduction magnets, each force-reduction magnet comprising or causing a first pole adjacent the rear layer for reducing a force to switch the switchable magnetic apparatus between the ON state and the OFF state;

wherein each rear-layer magnet overlaps one of the ferromagnetic blocks along a forward-rearward direction, and each of the plurality of spacers overlaps one of the one or more front-layer magnets along the forward-rearward direction;

wherein when in the ON state, each ferromagnetic block is adjacent same magnetic poles of the front-layer and rear-layer magnets, and the first pole of each force-reduction magnet is adjacent an end with an opposite pole of a first one of the rear-layer magnets; and wherein when in the OFF state, each ferromagnetic block is adjacent different magnetic poles of the front-layer and rear-layer magnets, and the first pole of each force-reduction magnet is adjacent an end with a same pole of a second one of the rear-layer magnets.

19. The switchable magnetic apparatus of claim 1, wherein the first and second layers are rotatably movable relative to each other.

20. The switchable magnetic apparatus of claim 15, wherein the one or more additional magnets comprise one or more permanent magnets.

* * * * *